United States Patent

Funk

[15] 3,684,003
[45] Aug. 15, 1972

[54] THERMIT PIPE WELDING MOLD
[72] Inventor: Charles F. Funk, 33 54th St., Gulfport, Miss. 39501
[22] Filed: Jan. 28, 1971
[21] Appl. No.: 110,501

[52] U.S. Cl. .................164/362, 164/349, 249/100, 164/DIG. 012
[51] Int. Cl. .............................................B22c 9/08
[58] Field of Search....249/100, 98, 83; 164/DIG. 12, 164/108, 334, 332, 333

[56] References Cited
UNITED STATES PATENTS
2,313,074   3/1943   Jewell......................285/114
2,469,062   5/1949   Begtrup..............164/DIG. 12
2,763,923   9/1956   Webb......................29/472.1

Primary Examiner—J. Spencer Overholser
Assistant Examiner—V. K. Rising
Attorney—Hyer, Eickenroht, Thompson & Turner

[57] ABSTRACT

A mold is disclosed for conducting molten weld metal from a crucible to a position surrounding the abutting ends of two pipe joints to fuse the weld metal and the abutting pipe ends.

7 Claims, 8 Drawing Figures

PATENTED AUG 15 1972 3,684,003
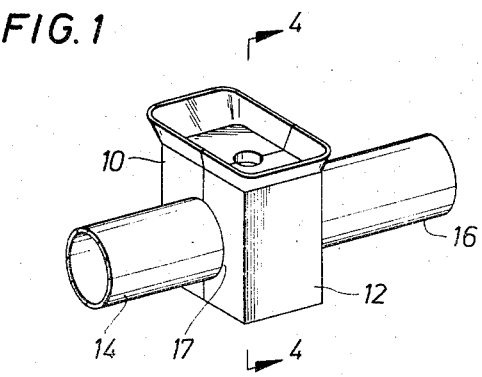
FIG. 1
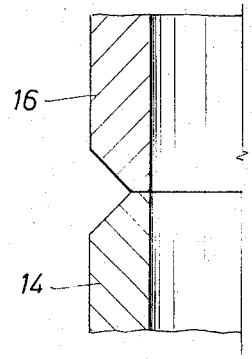
FIG. 2
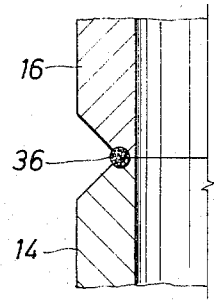
FIG. 3
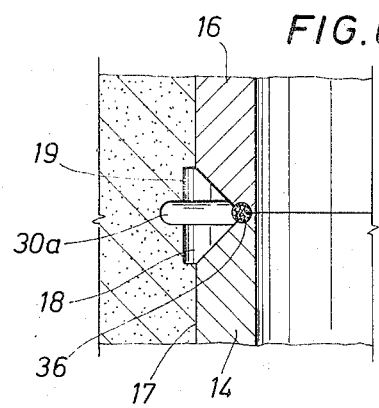
FIG. 6A
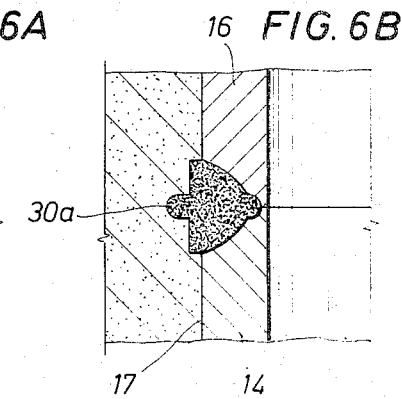
FIG. 6B
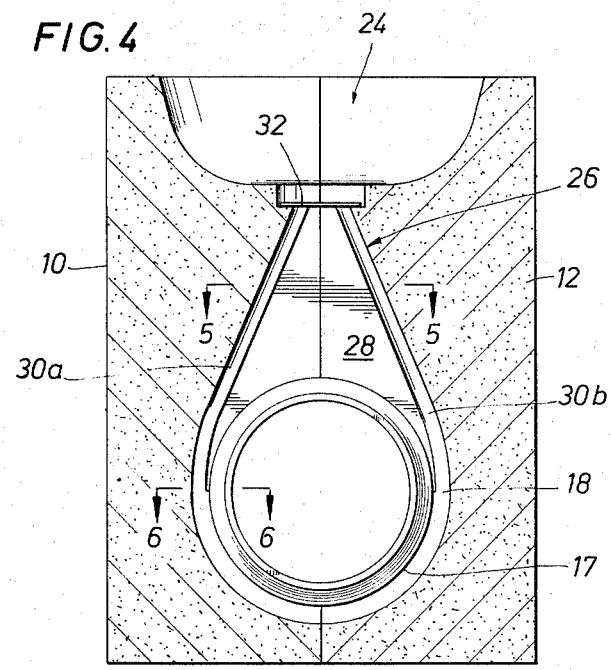
FIG. 4
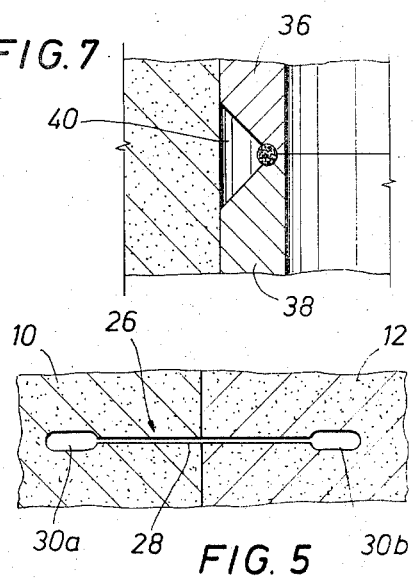
FIG. 7
FIG. 5
Charles F. Funk
INVENTOR
BY Nyer, Eckenroht,
Thompson & Turner
ATTORNEYS

THERMIT PIPE WELDING MOLD

This invention relates to pipe welding generally and in particular to a mold for welding pipe using the Thermit welding process.

Practically all pipe welding today uses the electric arc method. The welds are made by hand or by a welding machine. In either event, it usually requires several passes of the electrode before the weld is completed. Where high pressures are involved, or the line is to carry fluids, such as oil or gas, the weld is often inspected, sometimes after each pass. All this is very time consuming; therefore it would be very advantageous if the weld could be made in one step.

The Thermit welding process has been used before to weld pipe joints together. It has the advantage that it completes the weld in one operation. Two types of processes have been used. In one, the superheated metal produced by the reduction of the oxide of the metal in the Thermit process is used to heat the ends of the pipe to fusion temperature. The ends were then forced together to complete the weld. In this process, the Thermit process contributed no weld metal, only heat.

In the other, the superheated metal was used as the weld metal to connect the ends of the pipe as well as supplying the heat to raise the ends of the pipe to fusion temperature. The reduction reaction that produces the weld metal occurs at a point remote from the ends of the pipe. After the reaction is completed, the superheated weld metal is conducted into the desired position between the pipe ends. It is this part of the process that produces the problem. Usually, the crucible in which the reaction takes place is above the pipe ends so that molten weld metal can flow by gravity from the crucible to the pipe. A mold is placed around the pipe that combines with the pipe to form a cavity to be filled with the molten metal. When the molten metal is introduced into the cavity from the top, it flows downwardly around the pipe to the bottom. In doing so it gives up heat rapidly to the pipe joints, which act as two large heat sinks. Often the temperature of the metal reaching the bottom of the cavity would have lost so much heat that it would be too cool to produce a satisfactory weld. Conversely, the metal flowing into the top would overheat the pipe at this point, often to the point that the weld metal would burn through the pipe.

It is an object of this invention to provide a mold for welding two pipe joints that conducts the weld metal from the crucible to a position to weld the pipe joints with a minimum of flow of the weld metal along the pipe to produce substantially uniform fusion of the weld metal and the pipe throughout the weld area.

It is another object of this invention to provide a mold to weld two pipe joints together using the Thermit welding process that will conduct the superheated weld metal from the crucible of the mold to the desired position around the pipe ends in such a manner that the temperature of the weld metal, when in position adjacent the two pipe ends, is sufficient to raise the metal of the pipe ends to fusion temperature generally uniformly around the circumference of the pipe ends.

It is another object of this invention to provide a mold for welding two pipe joints together with the Thermit welding process that conducts the superheated weld metal in the crucible of the mold to its position adjacent the pipe ends with a minimum loss of heat to the pipe until the weld metal reaches its final position relative to the pipe.

It is another object of this invention to provide a mold for welding two pipe joints together employing the Thermit welding method that is of simple construction but that will position the weld metal produced by the Thermit reaction in position around the pipe ends so that a uniform fusion between the weld metal and the pipe ends is obtained around the complete circumference of the weld.

These and other objects, advantages, and features of this invention will be apparent to those skilled in the art upon consideration of this specification, including the attached drawings and claims.

In the drawings, FIG. 1 is an isometric view of the preferred embodiment of the mold of this invention in position to weld the adjacent ends of two joints of pipe;

FIG. 2 shows how the ends of pipe joints are prepared for welding;

FIG. 3 is a view similar to FIG. 2 showing the ends of the pipe joints in FIG. 2 after a root pass has been made with an electric arc electrode to seal the joint between them and to hold the ends in alignment until the weld has been completed;

FIG. 4 is a sectional view taken along line 4—4 of FIG. 1;

FIG. 5 is a sectional view taken along line 5—5 of FIG. 4;

FIG. 6A is a sectional view taken along line 6—6 of FIG. 4 showing the cavity formed by the mold and the pipe ends to receive and position weld metal;

FIG. 6B is a view similar to FIG. 6A after the welding process has been completed; and FIG. 7 is a view similar to the view in FIG. 6A showing an alternate cavity that could be formed by the side walls of the opening in the mold and the pipe joints.

The embodiment of the mold of this invention shown in the drawing is designed to butt weld pipe. It is made in two halves, 10 and 12, so that they can be brought together, as shown in FIG. 1, to encircle and enclose the ends of pipe joints 14 and 16. The mold is made of a refractory material, such as foundry sand that is held together by a suitable binder.

The mold includes a lower section that is adapted to surround the ends of the pipes and adjacent portions thereof adjacent the ends. The lower section has an opening 17 to receive the ends of the pipe joints. The side walls of the opening are shaped to combine with the surface of the pipe joints to which weld metal is to be fused to form an annular cavity 18. In the embodiment shown, opening 17 has an internal diameter substantially equal to the outside diameter of the pipe to be welded, except for portion 19 that has an internal diameter greater than that of the pipe. It is the walls of this groove that combine with the pipe walls to form annular cavity 18 that is to receive the weld metal.

When butt welding pipe, the ends are usually prepared as shown in FIG. 2 with the abutting ends beveled to form a V-shaped annular groove in which the weld metal is deposited. The rest of cavity 18 then is formed by beveled surfaces 20 and 22 on the ends of pipe joints 14 and 16, respectively. Preferably, groove 19 is about equal in width to the V-groove formed by the beveled surfaces.

The upper section of the mold includes the crucible, which is a cavity 24 formed by the two halves of the mold in which the material is placed to react to provide the molten, superheated metal to make the weld. In the usual Thermit welding process, the material is a mixture of aluminum and iron oxide. Additional materials are added to give the weld metal the desired physical properties. The reaction is started by supply heat, usually by igniting a small quantity of magnesium. The aluminum being a more active metal than the iron will reduce the iron oxide. This is an exothermic reaction that produces sufficient heat to superheat the iron and other materials, thereby providing a body of very hot, molten weld metal.

The mold includes gate 26 that connects annular cavity 18 with the bottom of crucible 24. The purpose of the gate is to conduct the molten, superheated, weld metal from the crucible to a position encircling the abutting ends of the pipe joints so that the heat of the metal will raise the metal of the pipe to fusion temperature, after which, the weld metal and pipe metal can cool and solidify into a continuous bond of metal between the two joints of pipe. In accordance with this invention, the metal is conducted from the crucible to cavity 18 in such a way that the weld metal that fills the lower portion of the cavity will be substantially as hot as the metal that fills the upper portion of the cavity to thereby produce a substantially uniform weld around the ends of the pipe joints. In the embodiment shown, gate 26 has central section 28 and two outside sections 30a and 30b. Central section 28 of the gate increases in width downwardly between sprue 32 in the bottom of the crucible and the upper portion of cavity 18. Outside sections 30a and 30b of the gate diverge downwardly from sprue 32 and connect with the lower portion of cavity 18. The three sections of the gate are connected together, as shown in FIG. 5, until the central sections stop about halfway around the cavity toward the bottom side of the pipe joints. The outside sections continue around the cavity until they meet below the pipe. To allow the lower portion of the cavity to be supplied with metal from the gate, rather than have the metal enter the cavity at the top and run around the pipe to the bottom, the width of the center section is such that the flow of metal through this section of the gate is restricted sufficiently to cause the metal to flow through outside sections 30a and 30b to the lower portion of the cavity. This metal can flow into position in the cavity between the pipe without having contacted the pipe before. As explained above, this reduces substantially the heat loss of the metal before it is in position to form the weld. There will be some metal that will reach the upper portion of cavity 18 before the lower portion is filled and flow along the cavity in contact with the pipe, but this is held to a minimum because of the design of the gate in accordance with this invention.

Disc 34 is used in a conventional manner to close sprue 32 in the crucible and hold the material in the crucible until the exothermic reaction is complete at which time the heat of the molten iron will burn through disc 34 and allow metal to flow from the sprue into the gate.

Before the pipe joints are placed in the mold, it is desirable to make one pass with a conventional electric arc electrode around the abutting ends. This is usually called a "root pass." Such a root pass 36 is shown in FIG. 3. This serves to connect the two pipe joints together and to hold them in alignment until the welding process can be completed. It also seals the two ends so that the molten weld metal flowing in between the two ends during the welding process will not flow into the interior of the pipes themselves. Alternatively, backup plates inside the pipe could be used to perform these functions. The completed weld is shown in cross section in FIG. 6B. The weld metal produced by the exothermic reaction and positioned by the mold of this invention will fuse with the beveled surfaces on the pipe ends and also with a portion of root pass 36 so that the two pipe joints are connected together by a homogeneous, fused mass of weld metal.

After the weld is completed the sand mold can be knocked away from the pipe. Any of the metal that remained in the gate and that extends out from the pipe an undesirable distance can be knocked off with a hammer.

As shown in FIGS. 6A and 6B, annular cavity 18, being formed in part by annular groove 19 in the mold, produces a ring of metal around the weld that is larger in diameter than the pipe. This is to provide added strength to the joint. If it is not desirable, of course, the mold can be designed without groove 19 to form, with the pipe joints 36 and 38, annular cavity 40, as shown in FIG. 7, that will produce a weld that is flush with the outside of the pipe.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A mold for use in welding two joints of pipe using the Thermit process, comprising, a lower section having an opening in which the ends of two pipe joints can be positioned for welding, the side walls of the opening being shaped to combine with the surfaces of the pipe joints to which weld metal is to be fused to form an annular cavity to hold weld metal in position to fuse with the surfaces of the pipe joints to be welded, a crucible section above the lower section for holding the Thermit material that produces a quantity of superheated weld metal to fuse with the surfaces of the pipe joints to be welded, and a gate in the mole to conduct the weld metal from the crucible to the lower section to be held by the lower section in welding position, said gate comprising an opening that extends downward from the bottom of the crucible section with a central section that connects the crucible with the upper portion of the internal cavity of the lower section of the mold and two outside sections that extend downwardly from the crucible and connect the crucible to the lower portion of the internal cavity of the lower section of the mold, said central section of the gate having a width less than that of the outside sections of the gate and such that the flow of weld metal through the central section will be restricted sufficiently to cause most of the metal required to fill the lower portion of the cavity to flow through the outside sections of the gate and into the lower portion of the cavity.

2. The mold of claim 1 in which the side walls of the opening in the lower section that combines with the surfaces of the pipe joints to form said annular cavity form an annular groove so that the weld metal is shaped into a ring that encircles the pipe ends and has a diameter greater than that of the pipe joints.

3. The mold of claim 1 in which the outside sections of the gate are about three times wider than the central section.

4. The mold of claim 1 in which the outside sections of the gate extend around the lower portion of the annular cavity and connect at the bottom of the cavity.

5. A mold for positioning superheated metal around the adjacent beveled ends of two joints of pipe to butt weld the two pipes together, said mold comprising a body of refractory material with a lower section having an opening adapted to receive the ends of the pipes and portions thereof adjacent the ends and form with the surfaces of the pipe to be fused with the weld metal, an annular cavity for surrounding the abutted ends of pipes, a crucible section above the lower section of the mold for holding a metallic mixture, such as a mixture of iron oxide and aluminum, that will produce a quantity of superheated weld metal through an exothermic reaction of the materials in the mixture, and a gate section extending upwardly from the annular groove in the lower section to the bottom of the crucible section to conduct the superheated weld metal from the crucible section to the annular cavity in the lower section, said gate section including an opening having a central section that extends between the upper portion of the annular cavity and the bottom of the crucible and having a width such that the flow of weld metal through the central section is restricted, and two outside sections that are located on opposite sides of the central section and extend upwardly from the annular cavity to the bottom of the crucible, said outside sections being substantially wider than the central section to permit the weld metal from the crucible to readily flow from the crucible to the annular cavity, said outside sections being located to intersect the annular cavity where the cavity is about midway from the bottom of the pipe so that the superheated metal that fills the lower half of the annular cavity flows to its position in the cavity along the cavity wall and not the pipe thereby reducing the heat loss from the weld metal to the pipe before the weld metal is in position to weld the pipe.

6. The mold of claim 5 in which the outside sections of the gate are about three times as wide as the central section.

7. The mold of claim 5 in which the outside sections of the gate extend around the lower portion of the annular cavity and connect below the pipe.

* * * * *